United States Patent [19]

Williams

[11] Patent Number: 4,701,488

[45] Date of Patent: Oct. 20, 1987

[54] AMINOORGANOPOLYSILOXANE COMPOSITIONS WITH IMPROVED COMBUSTION RESISTANCE

[75] Inventor: Thomas C. Williams, Ridgefield, Conn.

[73] Assignee: Union Carbide Corporation, Danbury, Conn.

[21] Appl. No.: 845,987

[22] Filed: Mar. 31, 1986

[51] Int. Cl.$^4$ .................. C08K 5/55; C08K 5/13; C08K 5/09; C08K 5/07; C08K 5/05

[52] U.S. Cl. ............... 524/266; 524/328; 524/356; 524/398; 524/399; 524/403; 524/406; 524/407

[58] Field of Search ............. 524/266, 328, 398, 399, 524/356, 403, 406, 407, 588; 528/21, 38; 525/474, 477

[56] References Cited

U.S. PATENT DOCUMENTS

| | | | |
|---|---|---|---|
| 3,137,670 | 6/1964 | Maneri | 260/37 |
| 3,142,655 | 7/1964 | Bobear | 524/403 |
| 3,449,289 | 6/1969 | Schank et al. | 260/37 |
| 3,514,424 | 5/1970 | Noble et al. | 260/37 |
| 3,539,530 | 11/1970 | Karstedt | 524/403 |
| 3,652,488 | 3/1972 | Harder | 524/403 |
| 3,692,732 | 9/1972 | Degen et al. | 524/403 |
| 3,711,520 | 1/1973 | Pfeifer et al. | 524/403 |
| 3,734,881 | 5/1973 | Shingledecker | 260/37 |
| 3,810,925 | 5/1974 | Viksne | 524/403 |
| 3,821,140 | 6/1974 | Milbert | 260/18 |
| 3,936,476 | 2/1976 | Itoh et al. | 260/37 |
| 3,966,188 | 12/1976 | Laur | 524/403 |
| 4,025,485 | 5/1977 | Kodama et al. | 260/37 |
| 4,102,852 | 7/1978 | DelaTorre et al. | 260/37 |
| 4,108,825 | 8/1978 | Hayes | 260/37 |
| 4,366,278 | 12/1982 | Hamada et al. | 524/403 |
| 4,404,305 | 9/1983 | Gutek | 524/118 |
| 4,405,425 | 9/1983 | Schiller et al. | 204/159 |
| 4,548,979 | 10/1985 | Weise et al. | 524/403 |

OTHER PUBLICATIONS

MacLaury, M. R., The Influence of Platinum Fillers and Cure on the Flammability of Peroxide Cured Silicone Fluid, Journal of Fire & Flammability, vol. 10, pp. 175-198 (Jul. 1979).

*Primary Examiner*—Veronica P. Hoke
*Attorney, Agent, or Firm*—S. H. Flynn

[57] ABSTRACT

Combustion-resistant heat-curable compositions comprising:
(a) an aminoorganopolysiloxane polymer containing an average of at least one hydrogen atom bonded to nitrogen in at least two of the silicon-bonded primary or secondary aminoorgano groups;
(b) the reaction product of an organic polyisocyanate and a compound containing at least one alcoholic, phenolic, silanic or oximyl hydroxyl group or thiol group as a curing agent; and
(c) a combustion inhibiting amount of an additive selected from the group consisting of:
  (i) a chromium compound;
  (ii) an iridium compound;
  (iii) a molybdenum compound;
  (iv) a rhodium compound;
  (v) a mixture of (I) platinum or a platinum compound and (II) a compound selected from the group consisting of a barium compound, a bismuth compound, a boron compound, a calcium compound, a chromium compound, a cobalt compound, a gallium compound, an iridium compound, a magnesium compound, a manganese compound, a molybdenum compound, a nickel compound, a palladium compound, a rhodium compound, a thorium compound, an uranyl compound, an yttrium compound, a zinc compound, a zirconium compound and a rare earth metal compound; and
  (vi) a mixture of a platinum compound and a dihydrocarbylsilanediol.

55 Claims, No Drawings

AMINOORGANOPOLYSILOXANE COMPOSITIONS WITH IMPROVED COMBUSTION RESISTANCE

FIELD OF THE INVENTION

This invention relates to heat-curable aminoorganopolysiloxane compositions having improved combustion resistance.

BACKGROUND OF THE INVENTION

Heat-curable aminoorganopolysiloxane compositions are described in U.S. Pat. No. 3,449,289 (hereinafter referred to as Schank et al.). The compositions disclosed in Schank et al. (hereinafter referred to as the "Schank et al. compositions") comprise (a) an aminoorganopolysiloxane copolymer containing an average of at least 2 silicon-bonded groups represented by the formula —$R^1NZ_2$ and consisting essentially of units of the formula:

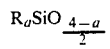

and units of the formula:

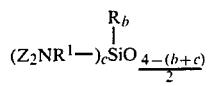

wherein R is a monovalent hydrocarbon radical or a substituted monovalent hydrocarbon radical wherein the substituents are selected from the class consisting of fluoro substituents, cyano groups, alkoxy groups, polyoxyalkylene-substituted alkoxy groups, carbalkoxy groups and nitro groups; $R^1$ is a divalent hydrocarbon group having at least three carbon atoms separating the [—$NZ_2$] group from silicon; Z is hydrogen, a group represented by R as hereinbefore defined, or an amino substituted monovalent hydrocarbon group, at least one of the amino nitrogen atoms present in the group represented by the formula —$R^1NZ_2$ having a hydrogen atom attached thereto; a is 1, 2 or 3 and has an average value of from about 1.8 to about 2.2; c is 1, 2 or 3, b is 0, 1 or 2; and the sum of (b+c) is never greater than 3 and has an average value of from 1.8 to about 2.2; and (b) the reaction product of an organic polyisocyanate and a compound containing an alcoholic, phenolic, silanic or oximyl hydroxyl group or thiol group (hereinafter referred to as "blocked isocyanates") as a curing agent.

The Schank et al. compositions are highly stable and, upon curing by the reaction of the active hydrogen of the primary or secondary aminoorgano groups of (a) with the urethane or thiourethane groups of (b), are bondable and highly durable. However, the cured Schank et al. compositions can suffer from autogenous combustion, i.e., the cured compositions continue to burn after removal of an igniting flame. This problem renders the use of the cured Schank et al. compositions unacceptable for certain applications in which fire safety is important.

Schank et al. broadly discloses that fillers, thermal stabilizers and anti-oxidants are possible additional components in the Schank et al. compositions. Among the fillers disclosed by Schank et al. are zinc oxide and zirconium silicate. No specific thermal stabilizers or anti-oxidants are disclosed in Schank et al. There apparently is no prior art specifically disclosing the use of any specific combustion inhibiting additive to compositions cured by the mechanism involved in the cure of the Schank et al. compositions (i.e., the reaction of an amino nitrogen in a primary or secondary aminoorgano group of an aminoorganopolysiloxane with the urethane or thiourethane group of a blocked isocyanate). On the other hand, there is considerable prior art relating to the use of metal combustion inhibiting additives in organopolysiloxane elastomer compositions cured by other mechanisms. Such other curing mechanisms include curing by the action of free radicals generated by peroxides or the action of high energy electrons, curing through silicon-bonded vinyl groups, curing by the reaction of silicon-bonded vinyl groups with silicon-bonded hydrogen atoms, curing by the condensation of silicon-bonded hydroxy groups and silicon-bonded acyloxy groups, curing by the condensation of silicon-bonded hydrogen atoms and silicon-bonded hydroxy groups, and the like. The following is a description of the latter prior art.

U.S. Pat. No. 3,514,424 discloses flame-retardant, polydiorganosiloxane gum-based silicone elastomers prepared from compositions comprising an organosiloxane gum, a platinum compound and a non-alkaline filler which are cured with a peroxide or with high energy electrons. Gums containing aminoorgano groups and blocked isocyanate cross-linkers are not disclosed in this patent. This patent states that other generally equivalent noble metals, such as ruthenium, rhodium, iridium, palladium and osmonium, do not provide the desired flame retardance that platinum does for the compositions disclosed in this patent.

U.S. Pat. No. 3,734,881 discloses a self-extinguishing room temperature vulcanizable (RTV) silicone elastomer prepared from compositions comprising a hydroxy end-blocked polydimethylsiloxane, a silica or titanium dioxide filler, a platinum compound, a vinyl-containing silane cross-linking agent, and carbon black. Again, polysiloxanes containing aminoorgano groups and blocked isocyanate cross-linkers are not disclosed. This patent discloses that both platinum and carbon black are necessary for the RTV silicone elastomers to be self-extinguishing and that platinum alone does not provide self-extinguishing RTV elastomers. This patent additionally discloses that the presence of sulfur, tin, mercury, bismuth, or copper in the composition destroys the self-extinguishing properties of the silicone elastomer.

U.S. Pat. No. 3,821,140 discloses peroxide-cured, fire-resistant elastomers prepared from compositions comprising an organopolysiloxane rubber, an inorganic filler (e.g., titanium oxide), organic peroxide curing agents, and an additive comprising platinum and a rare earth metal oxide or rare earth metal hydroxide (the latter component optionally containing magnesium oxide). The patent discloses that conventional pigments such as chromium oxides and phthalacyanines and/or stabilizers such as iron, cerium and manganese octoates can optionally be introduced into the compositions.

U.S. Pat. No. 3,936,476 discloses silicone compositions comprising essentially (a) an organopolysiloxane; (b) finely divided silica filler; (c) finely divided manganese carbonate; and (d) platinum alone or in a platinum-containing compound. The compositions disclosed in this patent are cured utilizing organic peroxides or organohydrogenpolysiloxanes. This patent additionally discloses that the manganese carbonate in cooperation with the platinum or platinum-containing compound imparts excellent flame-retardant and self-extinguishing properties to the resulting silicone elactomers due to its function of generating $CO_2$ gas under heat as well as its catalytic function. This patent further discloses that although calcium carbonate, zinc carbonate, cobalt carbonate, sodium carbonate can generate $CO_2$ gas, these carbonates impart no improved self-extinguishing effects to the resulting elastomers and exert bad influences on the heat resistance of the elastomers.

U.S. Pat. No. 4,025,485 discloses fire-resistant compositions comprising an organopolysiloxane containing at least two silicon-bonded vinyl groups per molecule, an organohydrogenpolysiloxane containing at least three silicon-bonded hydrogen atoms, silica filler, zinc carbonate, ceric oxide and platinum.

U.S. Pat. No. 4,102,852 discloses a self-extinguishing room temperature vulcanizable (RTV) silicone rubber composition comprising an hydroxy end-blocked diorganopolysiloxane polymer, a filler (e.g., titanium dioxide or zirconium oxide), a metal oxide (e.g., zinc oxide), a trihydrocarbonoxy silane cross-linking agent, carbon black, platinum (solid or complexed) and a titanium chelate catalyst. This patent discloses that for optimum self-extinguishing compositions there should be 0.5 to 20 percent phenyl content and 0.01 to 10 percent vinyl content, based on the base diorganopolysiloxane. This patent also discloses that the addition of platinum compounds, disclosed in U.S. Pat. No. 3,514,424 as useful flame retardants for heat-cured silicone rubber compositions, does not markedly improve the flame retardance of RTV silicone rubber compositions.

U.S. Pat. No. 4,108,825 discloses that the addition of ceric hydrate to compositions containing vinyl-containing polydiorganosiloxane and organohydrogensiloxanes containing silicon-bonded hydrogen atoms when cured with a platinum-containing catalyst that is soluble in the vinyl-containing polydiorganosiloxane yield elastomers with improved flame retardance.

U.S. Pat. No. 4,405,425 dislcoses flame-retardant elastomers prepared from compositions comprising an organopolysiloxane, graphite and a metal hydroxide and/or a hydrate of a metal oxide such as alumina trihydrate, ceric hydroxide, cerous hydroxide, tricalcium aluminate hexahydrate and magnesium hydroxide. The compositions, depending on the storage stability, can be cross-linked by various means, including methylhydrogenpolysiloxanes and platinum catalysts.

In "The Influence of Platinum, Fillers and Cure on the Flammability of Peroxide Cured Silicone Rubber" [MacLaury, M. R., J. of FIRE & FLAMMABILITY, Vol. 10, 175 (July, 1979)], M. R. MacLaury (hereinafter referred to as "MacLaury"), in a detailed study of the action of platinum as a combustion inhibitor in organopolysiloxane compositions, concludes that the data present is consistent with the concept that free, uncured vinyl groups are important in flame retarding with platinum.

U.S. Pat. No. 3,137,670 discloses compositions comprising a diorganopolysiloxane and, as a heat stabilizer, a compound selected from the group consisting of manganese dioxide, nickelous hydroxide, nickelic oxide, chromic oxide, niobic oxide, cuprous oxide, cupric oxide, yttrium oxide, yttrium hydroxide and zirconium hydroxide. This patent discloses various curing agents useful with the composition including organic peroxides, hydrocarbonoxy silicates in the presence of metallic carboxylic acid catalysts, cellosolve silicates in the presence of metallic carboxylic acid salts and organohydrogensiloxanes. Compositions comprising aminoorganopolysiloxane polymers and blocked isocyanate cross-linking agents are not disclosed in this patent.

U.S. Pat. No. 4,404,305 discloses flame retardant translucent polyorganosiloxane resin compositions. In its discussion of the relevant prior art, this patent discloses that it is well known that the mechanism by which flame retardation is achieved varies with the particular compound and polymeric substrate, as do the adverse effects which flame retardants have on the physical properties of the substrate. This patent further discloses that flame retarding agents that have been proposed for use with elastomeric polysiloxanes include platinum and fumed titanium dioxide, optionally in combination with carbon black; platinum compounds in combination with conventional fillers; finely divided copper or copper compounds in a vinyl-containing polymer; powdered copper or copper compounds and various chlorinated organic compounds; and platinum compounds in combination with triphenyl phosphite. This patent then discloses a flame-retardant composition comprising a polyorganosiloxane resin, a halogenated organic compound and finely divided glass particles.

Thus, not ony does the prior art fail to disclose any specific metal combustion inhibiting additives for organosiloxane elastomer compositions which cure by the reaction of amino nitrogen with a urethane or a thiourethane, but even the prior art relating to the use of metal combustion inhibiting additives in organosiloxane elastomer compositions that cure by other mechanisms suggests that the effectiveness of metals for this purpose may be dependent upon the specific cure mechanism involved (see the MacLaury publication discussed above).

Accordingly, it is the object of this invention to provide heat-curable aminoorganopolysiloxane-blocked isocyanate compositions which have improved combustion resistance.

DESCRIPTION OF THE INVENTION

This invention relates to a heat-curable aminoorganopolysiloxane composition comprising:
(a) an aminoorganopolysiloxane polymer containing an average (per molecule) of at least one hydrogen atom bonded to nitrogen in at least two of the silicon-bonded primary or secondary aminoorgano groups;
(b) as a cross-linking agent, the reaction product of an organic polyisocyanate and a compound containing an alcoholic, phenolic, silanic or oximyl hydroxyl group or thiol group as a curing agent (a "blocked isocyanate"); and
(c) a combustion inhibiting amount of an additive selected from the group consisting of:
  (i) a chromium compound;
  (ii) an iridium compound;
  (iii) a molybdenum compound;
  (iv) a rhodium compound;
  (v) a mixture of (I) platinum or a platinum compound, and (II) a compound selected from the group consisting of a barium compound, a bismuth compound, a boron compound, a calcium compound, a chromium compound, a cobalt compound, a gallium compound, an iridium compound, a magnesium compound, a manganese compound, a molybdenum compound, a nickel compound, a palladium compound, a rhodium compound, a thorium compound, an uranyl compound, an yttrium compound, a zinc compound, a zirconium compound and a rare earth metal compound (i.e., a lanthanum, cerium, praseodymium, neodymium, samarium, europium, gadolinium, terbium, dysprosium, holmium, erbium, thulium, ytterbium or lutetium compound); and (vi) a mixture of platinum or a platinum compound and a dihydrocarbylsilanediol (e.g., diphenylsilanediol).

Preferably, the compounds used in the compositions of this invention as combustion inhibiting additives are carboxylates (e.g., alkanoates such as octoates, acetylacetonates or naphthenates), alkoxides (e.g., methoxides) or halides (e.g., chlorides) of the indicated compounds. Preferably, the compounds employed as combustion-inhibiting additives in this invention contain from one of twenty carbon atoms and, more preferably, from four to ten carbon atoms. When the compound is a halide, the preferred halogen is chlorine. These compounds should be readily dispersible or even soluble in the compositions. Most preferred compounds are those which are both soluble in the compositions and have low color and opacity.

The aminoorganopolysiloxane polymers which are employed in the heat-curable compositions of this invention contain an average of at least 2 silicon-bonded $-R^1NZ_2$. Typically, such polymers consist essentially of units of the formula:

$$R_a SiO_{\frac{4-a}{2}}$$

and units of the formula:

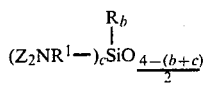

wherein R is a monovalent hydrocarbon radical or a substituted monovalent hydrocarbon radical wherein the substituents are selected from the class consisting of fluoro substituents, cyano groups, alkoxy groups, polyoxyalkylene-substituted alkoxy groups, carbalkoxy groups and nitro groups; $R^1$ is a divalent hydrocarbon group having at least three carbon atoms separating the $[-NZ_2]$ group from silicon; Z is hydrogen, a group represented by R as hereinbefore defined, or an amino substituted monovalent hydrocarbon group, at least one of the amino nitrogen atoms present in the group represented by the formula $-R^1NZ_2$ having a hydrogen atom attached thereto; a is 1, 2 or 3 and has an average value of from about 1.8 to about 2.2; c is 1, 2 or 3, b is 0, 1 or 2; and the sum of (b+c) is never greater than 3 and has an average value of from 1.8 to about 2.2. As is obvious from the definitions of a and the sum of (b+c) above, these aminoorganopolysiloxane polymers are composed primarily of disubstituted siloxane units, both these polymers may also contain minor amounts of mono-substituted siloxy units, such as $RSiO_{1.5}$ and $Z_2NR^1SiO_{1.5}$, and trisubstituted siloxy units, such as $R_3SiO_{0.5}$

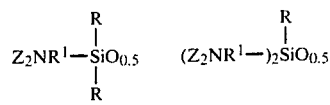

and $(Z_2NR^1-)_3SiO_{0.5}$. Minor amounts of other groups, attached to silicon, such as hydroxyl groups, —OR groups, —NH$_2$ groups, —NHR groups, —NR$_2$ groups and

groups wherein R is as hereinbefore defined may also be present in said aminoorganopolysiloxane polymers, and when such groups are present in those polymers they are usually present as end-blocking groups or terminal groups of the polymer chain. Polymers containing an average of from about one $-R^1NZ_2$ group per 3500 silicon atoms to about one $-R^1NZ_2$ group per 100 silicon atoms are preferred, and those containing an average of from about one $-R^1NZ_2$ group per 900 silicon atoms to about one $-R^1NZ_2$ group per 200 silicon atoms are particularily preferred. Polymers having a viscosity at room temperature of from about 100,000 centipoises to about 10 million centipoises are preferred, and those having a viscosity at room temperature of from about 1 million centipoises to about 3 million centipoises are particularly preferred.

Illustrative of the types of monovalent hydrocarbon groups and substituted monovalent hydrocarbon groups represented by R and Z in the above-mentioned formulae are alkyl groups, such as methyl, ethyl, propyl, n-butyl, t-butyl, n-octyl, n-octadecyl, and the like; aryl groups, such as phenyl, 1-naphthyl, and the like; cycloalkyl groups, such as cyclobutyl, cyclohexyl, cycloheptyl and the like; alkaryl groups, such as p-tolyl, ethylphenyl, xylyl and the like; aralkyl groups, such a benzyl, 2-phenylethyl and the like; olefinically unsaturated hydrocarbon groups, such as vinyl, allyl, 3-butenyl, 3-cyclohexenyl, ethynyl, propynyl, 3-vinylphenyl, and the like; substituted alkyl groups such as 2-cyanoethyl, 3-cyanopropyl, 3-methoxypropyl, 2-ethoxyethyl, 2-phenoxyethyl, 3-carbethoxypropyl, 3,3,3-trifluoropropyl and the like; substituted aryl groups such as p-phenoxyphenyl, 3-nitrophenyl, 4-cyanophenyl and the like; and substituted alkaryl groups such as 3-trifluoromethylphenyl and the like.

As hereinbefore indicated, Z may also represent an amino-substituted monovalent hydrocarbon group, as long as at least one of the amino nitrogen atoms present in the group represented by the formula $-R^1NZ_2$ has a hydrogen atom attached thereto, Thus, Z may also represent an aminoalkyl group, such as beta-aminoethyl gamma-aminopropyl, delta-aminobutyl, N-methyl beta-aminoethyl, N,N dimethyl-gamma-aminopropyl, and the like; or an aminoaryl group, such as m-aminophenyl, N-methyl-m-aminophenyl, N,N dimethyl-m-aminophenyl, and the like.

As is obvious from the definition of Z set forth above, the group represented by the formula $-R^1NZ_2$ can be a. primary or a secondary aminohydrocarbyl group, such as a primary or secondary aminoalkyl group, aminoaryl group, aminoalkaryl group, and the like; and when one or both of the groups represented by Z are amino-substituted hydrocarbon groups, the nitrogen atom attached to silicon through the divalent hydrocarbon group represented by $R^1$ can also be a tertiary amino nitrogen if at least one of the amino-substituted monovalent hydrocarbon groups represented by Z contains a primary or secondary amino group, thereby providing at least one amino nitrogen atom having a hydrogen atoms attached thereto. Aminoorganopolysiloxane polymers containing aminoalkyl groups attached to silicon, such as a gamma-aminopropyl and delta-aminobutyl groups; or aminoaryl groups attached to silicon, such as m-aminophenyl groups, are preferred.

Illustrative of the types of divalent hydrocarbon groups represented by $R^1$ in the formulae set forth above are groups such as trimethylene, tetramethylene, 1-methyltrimethylene 2-ethyltetraethylene, 3-cyclohexylene, m-phenylene p-phenylene, 5-naphthylene, and the like.

The polymers which are useful in this invention, in liquid form or in the form of a gum, are readily formed by base catalyzed rearrangement reactions which are well known in the art. For example, a cyclic diorganosiloxane or a mixture of such cyclics can be reacted with an aminohydrocarbylsiloxane polymer of the type employed in this invention.

As hereinbefore indicated, the curing agents which are useful in this invention are the reaction products of an organic polyisocyanate and a compound containing at least one alcoholic, phenolic, silanic or oximyl hydroxyl group or thiol group. Particularly useful as curing agents are those compounds which contain two or more monourethane or monothiourethane groups per molecule and which have the general formula:

$$R^2(Q)_n$$

wherein $R^2$ is an n-valent organic radical, n has a value of at least 2, and Q is selected from the class consisting of

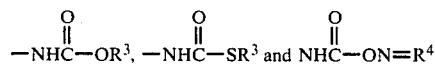

groups wherein $R^3$ is an organosilyl group, or a group represented by R, and $R^3$ is a geminally divalent hydrocarbon radical having both valences satisfied by the nitrogen atom of the oximyl residue.

Illustrative of the types of n-valent organic radicals represented by $R^2$ in the formula set forth above are groups such as 2,4-toluylene, 2,6-toluylene, 4,4'-diphenylenemethane, 3,3'-dimethyl-4,4'-biphenylene, poly(m-methylene-p-tolylene), hexamethylene, bis(ethylene)fumarate, tris(ethylene)trimellitato, and the like.

The curing agents used in the compositions of this invention are commonly called "blocked isocyanates" and, as hereinbefore indicated, are the reaction products of organic polyisocyanates with compounds bearing at least one alcoholic, phenolic, silanic or oximyl hydroxyl groups or thiol groups. Illustrative of the organic polyisocyanates which are useful in preparing the curing agents employed in this invention are isocyanates such a toluene-2,4-diisocyanate, toluene-2,6-diisocyanate, 4,4'-diisocyanato-diphenylmethane, 4,4'-diisocyanato-3,3'-dimethylbiphenyl, poly(m-methylene-p-isocyanatotoluene), hexamethylene diisocyanate, bis(2-isocyanato ethyl)-fumarate, tris(2-isocyanatoethyl)-trimellitate, and the like.

Illustrative of the hydroxyl or thiol compounds which are useful as blocking agents in preparing the curing agents employed in this invention are alcohols, such as ethanol, n-propanol, n-butanol, isobutanol, 2-ethylhexanol, and the like; phenols, such as phenol, the nitrophenols, the dinitrophenols, the cyanophenols, the naphthols, p-phenyl phenol, and the like; silanols, such as trimethylsilanol, triethylsilanol, ethylidimethylsilanol, phenyldimethylsilanol, hydroxypentamethyldisiloxane, 1-hydroxyheptamethyltrisiloxane and the like; oximes such as acetoxime, methyl ethyl ketoxime, diethyl ketoxime, propionaldoxime, butyraldoxime, benzaldoxime, and the like and thiols, such as lauryl mercaptan, octadecyl mercaptan, thiophenol, thiocresol, mercaptobenzothiazole, thionaphthol, and the like.

Certain beta-diketones can act as monohydric blocking agents for isocyanates because they are equilibrium mixtures of tautomeric keto and enol structures, i.e.

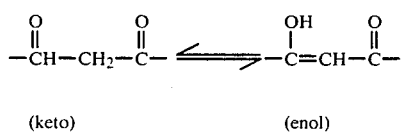

(keto)     (enol)

and can react as alcohols in the enol form. During the blocking reaction using beta-diketones, as the isocyanate reacts with available enol, the keto form rapidly rearranges to the enol form and the reaction of the isocyanate and enol continues until all the isocyanate is converted to urethane. Accordingly, the term "alcohols", as used in this application with respect to blocking agents, is meant to encompass these beta-diketones. Preferred beta-diketones are acetoacetic acid esters. Particularly preferred is ethyl acetoacetate.

The curing agents employed in the compositions of this invention are readily prepared by simply mixing together the blocking agent and polyisocyanate and, if necessary, warming the mixture gently for a short period of time. If desired, a mutual solvent for the blocking agent and the polyisocyanate may also be employed. To avoid the presence of any free isocyanate groups in the product, it is advisable to employ a slight excess of the blocking agent.

A particularly convenient method of preparing a curing agent for use in the compositions of this invention is to prepare separate solutions of polyisocyanate and blocking agent in a solvent in which the resulting curing agent product is insoluble, such as ligroin or ethyl ether. Upon mixing the separate solutions (and warming, if necessary), the product will precipitate as a fine powder, which can easily be recovered, for example, by filtration and drying.

Although the choice of curing agent used in the compositions of this invention is not narrowly critical with respect to the properties of the cured rubber, the choice of curing agent permits the curing conditions to be varied as desired. For example, when the phenol adduct of 4,4'-diisocyanatophenylmethane is employed as a curing agent, a cured elastomer having excellent physical properties is obtained in about 15 to about 30 minutes at a temperature of from about 320° F. to about 340° F., whereas when the acetoxime adduct of toluene diisocyanate is employed as a curing agent, a cured elastomer is readily obtained within minutes at temperatures of from about 250° F. to about 280° F.

The amount of curing agent which is employed in compositions of this invention depends primarily on the functionality of the curing agent, the concentration of amino-organo substituents present in the aminoorganopolysiloxane polymer, and the desired degree of cross-linking desired in the cured elastomeric product. A stoichiometric excess of from about 1.1 to about 2.0 urethane or thiourethane groups in the curing agent per amino-organo substituent in the aminoorganopolysiloxane polymer is preferred. Generally, the amount of curing agent will range from about 0.01 part to about 10 parts by weight per 100 parts by weight of polymer, with about 0.2 part to about 3.0 parts by weight per 100 parts by weight of polymer being preferred.

The compounds useful as combustion inhibiting additives in the compositions of this invention include any compounds formed from the above-mentioned metals that, preferably, are soluble or readily dispersible in the aminoorganopolysiloxane composition. Examples of suitable platinum additives are:

1. elemental platinum supported on low color, finely divided solids such as silica gels, gamma-aluminas and the like;
2. chloroplatinic acid;
3. platinum halide-olefin complexes;
4. platinum halide-cyclopropane complexes;
5. reaction products of chloroplatinic acid with alcohols, ethers, or aldehydes;
6. platinum halide-divinyltetramethyldisiloxane complexes; and
7. platinum halide-organophosphine complexes.

Preferred platinum additives are those which are both soluble in the compositions and have low color and opacity. Particularly preferred are platinum-divinyltetramethyldisiloxane complexes. A combustion inhibiting amount of a platinum additive in the compositions is an amount of compound that provides platinum metal in concentrations from about 1 to about 100 parts per million parts of the aminoorganosiloxane polymer and preferably from about 5 to about 60 parts per million parts of the aminoorganopolysiloxane polymer.

Examples of rare earth metal compounds useful as combustion inhibiting additives in the compositions of this invention are:

1. rare earth metal salts of aliphatic carboxylic acids, alpha- or beta-hydroxy carboxylic acids, N-substituted-alpha amino carboxylic acids, N-substituted imino diacetic acids, or nitrilotriacetic acid;
2. rare earth metal complexes with beta-diketones or beta-ketoesters; and
3. rare earth metal alkoxides, glyoxides, or phenoxides.

Preferred rare earth metal compounds are those which are both soluble in the compositions and have low color and opacity. Among the suitable rare earth metal compounds, cerium compounds are preferred for reasons of cost and availability. Among the suitable cerium compounds, the beta-diketonates and the salts of aliphatic carboxylic acids having 6 to 18 carbon atoms are preferred. A combustion inhibiting amount of a rare earth metal compound in the compositions is an amount of compound that provides from about 100 to about 7000 parts of rare earth metal per million parts of aminoorganosiloxane polymer and preferably from about 300 to about 5000 parts per million parts of aminoorganopolysiloxane polymer.

Examples of compounds other than platinum or rare earth metals that are useful as combustion inhibiting additives in the compositions of this invention include:

1. salts of carboxylic acids such as barium 2-ethoxyhexanoate, chromium oleate, chromium acetate, bismuth octoate, molybdenum octoate, magnesium naphthenate, uranyl diacetate, and the like;
2. complexes with beta-diketone compounds such as chromium acetylacetonate, gallium acetylacetonate, molybdenum dioxide bis(acetylacetonate), and the like;
3. carbonyl complexes such as iridium carbonyl tetramer, hexarhodium hexadecacarbonyl, and the like;
4. olefin complexes such as chromium cycloheptatriene tricarbonyl, iridium chloro, 1,5-cyclooctadiene dimer, and the like;
5. alkoxides, glyoxides and phenoxides such as trimethoxyboron, magnesium ethylene glycolate, zinc 4-methylphenoxide, and the like; and
6. halide and oxyhalide salts such as manganese fluoride, iridium trichloride, molybdenum dioxydichloride, and the like.

As stated above, the chromium compounds, iridium compounds, molybdenum compounds and rhodium compounds useful in the compositions of this invention are effective as combustion inhibiting additives either alone (i.e., without platinum) or as mixtures with platinum or platinum compounds.

A combustion inhibiting amount of a compound other than platinum or a rare earth metal in the compositions of this invention is an amount of compound that provides from about 100 to about 3000 parts of metal per million parts of aminoorganopolysiloxane polymer and preferably from about 300 to about 2000 parts per million parts of aminoorganopolysiloxane polymer. The chromium compounds, iridium compounds, molybdenum compounds and rhodium compounds useful in the compositions of this invention are effective as combustion inhibiting additives in the amounts described above when the compounds are used alone (i.e., without platinum) or when the compounds are used in a mixture with platinum or platinum compounds. A combustion inhibiting amount of dihydrocarbylsilanediol in the platinum compound-dihydrocarbylsilanediol mixture used in the compositions of this invention is from about 1 to about 15 parts of dihydrocarbylsilanediol per hundred parts of the aminoorganopolysiloxane polymer and preferably from about 2 to about 10 parts per hundred parts of the aminoorganopolysiloxane polymer.

Preferably, the combustion inhibiting additive in the compositions of this invention is a combination of a platinum compound and a rare earth metal compound. More preferably, the combustion inhibiting additive in the compositions of this invention is a combination of a platinum compound and a cerium compound.

In addition to the above-mentioned components, the compositions of this invention may also contain additional components such as fillers (e.g., silica), coloring agents, plasticizers, softeners, odorants, bonding additives, and the like. When highly-reinforcing silica-fillers (e.g., fume silica) are employed as filler materials in the compositions of this invention, it is preferred that a hydroxyl end-blocked organopolysiloxane fluid such as a hydroxyl end-blocked dimethylsiloxane fluid also be included in the composition to inhibit crepehardening and facilitate the incorporation of the silica filler materials in said compositions.

Any suitable means can be used for mixing together the various components employed in preparing the compositions of this invention, such as rubber mills or internal rotary blade mixers like Banbury mixers. Mixing can also be accomplished by dissolving or suspending the various components in suitable liquid solvents and combining the resultant solutions or slurries by simply stirring said solutions or slurries together and then removing the solvents from the mixture. The sequence in which the components are combined is not critical, and has only very slight effects on the properties of the compositions which are obtained, both before and after conversion of these compositions to elastomers. A typical method of preparing the compositions of this invention is one wherein the aminoorganopolysiloxane polymer is placed on a rubber mill or in an internal mixer such as a Banbury mixer, and the polymer mass is then agitated while any ancillary ingredients which are to be employed such as fillers, pigments, lubricants, and the like are incorporated into the mass as desired. The combustion inhibiting additives useful in the compositions of this invention can be added at any point in the process of preparing the compositions of this invention although it is often most convenient to add them after the ancillary ingredients, if any, have been incorporated into the aminoorganopolysiloxane polymer mass. The blocked isocyanate curing agent is customarily but not necessarily added last. The resulting plastic mass may then be stored for an indefinite period of time prior to use, it can immediately be shaped by extrusion, calendaring, molding and the like; or it can be dissolved in a suitable solvent; applied to a substrate material, and the solvent removed to form a coating on said substrate material.

The compositions of this invention are converted to elastomers by heating the compositions to a curing temperature and maintaining said compositions at this temperature for a period of time sufficient to convert the composition to an elastic, insoluble elastomer. The ranges of curing temperatures and the periods of time necessary to effectively cure the compositions of this invention are not narrowly critical; and, as hereinbefore indicated, these ranges are somewhat dependent on the specific curing agent which is employed. Temperatures of from about 240° F. to about 400° F. for a period of from about 5 hours to 1 minute are sufficient to cure the compositions of this invention to elastomers. Temperatures of from about 250° F. to about 350° F. over a period of time of from about 1 hour to about 5 minutes are preferred.

The compositions of this invention can be cured by heating said composition in a mold, by subjecting them to air, steam or other gaseous media which are hot enough to effect a cure of said compositions, or by immersing said compositions in a bath of a molten metal, salt or other liquid which is inert toward the composition and which is at a temperature sufficient to effect a cure. After the composition has been cured, it is often desirable to subject the resulting elastomer to a postcure treatment at elevated temperatures to stabilize the physical properties of the elastomer, and in the case of those elastomers which have been mold-cured, to remove any volatile components which may have remained in the composition through the mold-curing step. The postcuring treatment can be conducted by heating the resulting elastomer in an oven such as a forced draft air oven at temperatures of from about 200° F. to about 300° F. for a period of time of from about 5 hours to about 30 minutes.

The compositions of this invention are free of any components which are readily combustible, shock sensitive or explosive such as peroxide curing agents; and they may be subjected to ordinary storage conditions indefinitely in open air without loss of their ability to be cured. They can be prepared, stored and fabricated at temperatures of up to 50° C. and above and remain free from premature curing or scorching, and they may also incorporate ancillary components which adversely affect curing agents utilized for non-aminoorganopolysiloxane compositions. The compositions of this invention also may be cured in air or in other molecular oxygen containing atmospheres without oxygen inhibition of curing processes occurring, and without porosity and discoloration of the cured product taking place.

The compositions of this invention will bond uniformly and directly to a wide variety of substrate materials in the absence of a bonding agent. When the compositions of this invention are employed, there is no need for special primers or complicated bonding procedures, the only requirement being that the surfaces to be joined are clean and in firm contact with the composition during the curing process.

The aminoorganopolysiloxane elastomers produced in accordance with this invention can be employed in any of the conventional known uses for organopolysiloxane elastomers, including their use as thermal and electrical insulators, gaskets, seals, vibration dampings, coatings, molded elastomer products, and the like. Fabrics (such as glass fiber fabrics) and other fibrous substances coated with the compositions of this invention can be utilized in various applications requiring combustion resistant materials, such as roofs of sports arenas and greenhouses, insulation for electrical devices and backing material for tapes.

The following examples are presented to illustrate the present invention.

The terms and abbreviations used in the Examples have the following meanings:

| Term or Abbreviation | Meaning |
| --- | --- |
| Desmodur KL-5-2371 | This is a blocked isocyanate. It is the ethyl acetoacetate adduct of isophorone diisocyanate in 2-methoxyethyl acetate as a solvent, the ratio of diisocyanate to acetate being 75/25 by weight (commercially available from Mobay Chemical Corp.). |
| sec. | second |
| in. | inch |
| ppm | parts by weight per million parts by weight |
| pph | parts by weight per hundred parts by weight |

EXAMPLE 1

Preparation of an Aminoorganopolysiloxane Composition

A. To a 4-neck, round-bottom, glass reaction vessel fitted with stirrer; thermometer and blanketed with nitrogen, there was charged 400 parts by weight of octamethylcyclotetrasiloxane and 1.8 parts by weight of 4-aminobutylmethylcyclosiloxane to form the reaction mixture and heated in an oil bath at 90° C. for 30 minutes. A catalytic amount of tetramethylammonium-dimethylsilanolate catalyst is added to the reaction mixture to provide about 150 parts tetramethylammonium ion per million parts of organopolysiloxanes. The reaction mixture is then heated at 90° C. for 3 hours, then at 150° C. for 2.5 hours to decompose the catalyst and finally at 150° C. for 4 hours under reduced pressure (0.05 mm Hg) to remove volatile matter. The reaction mixture is then cooled at room temperature to produce a colorless, transparent plastic aminoorganopolysiloxane polymer gum.

B. 100 parts by weight of the polymer gum of A is mixed on a 2-roll rubber mill with 30 parts by weight fume silica and 15 parts by weight of an hydroxy endblocked dimethylsiloxane fluid having an average molecular weight of about 740 and having an OH content of 2.3%. The resultant mixture was stored at room temperature for 3 days and then mixed for several minutes on a 2-roll rubber mill to form a colorless, translucent plastic coating base.

C. 100 parts by weight of the coating base was added to a solvent mixture of 595 parts by weight of toluene and 105 parts by weight of n-butanol and stirred for about 16 hours at room temperature to form a solution free of visible particles when observed by oblique lighting on a free draining liquid film.

D. The following compositions were prepared:

| Ingredient | Composition No. | | | | |
|---|---|---|---|---|---|
| | 1 | 2 | 3 | 4 | 5 |
| Solution from C (parts by weight) | 100 | 100 | 100 | 100 | 100 |
| Desmodur KL-5-2371 (parts by weight) | 0.175 | 0.175 | 0.175 | 0.175 | 0.175 |
| Platinum[1] (ppm*) | 0 | 30 | 60 | 0 | 30 |
| Cerium[2] (ppm*) | 0 | 0 | 0 | 6960 | 6960 |

*Parts per million parts aminoorganopolysiloxane polymer.
[1]Added as chloroplatinic acid/divinyltetramethyl-disiloxane complex (available commercially as "PC-075" from Petrarch Systems, Inc.).
[2]Added as cerium octoate.

EXAMPLE 2

Preparation and Combustion Testing of Composites of Aminoorganopolysiloxane Compositions and Glass Fiber Cloth A. Swatches of square weave glass fiber cloth (12 picks/inch, warp and woof) were dip coated with Compositions 1-5 of Example 1 to provide about a 50 wt.% air-dried coating pickup per swatch. The composites of glass fiber cloth and the respective compositions were heated in a hot air oven at 320° F. for 30 minutes. Test strips (0.5×6.0 inches) were then cut from the composites. These test strips were suspended vertically in a ventilated enclosure, clamped at the upper end and ignited by immersion of about 0.5 inches of the lower end into a 1 inch butane flame for 15 seconds. The flame was removed and time to zero after-glow and the length of the burned portion of the strip were measured. Results of this combustion testing are shown in Table 1.

TABLE 1

| | Composite (Cloth & Composition) | | | | |
|---|---|---|---|---|---|
| | A | B | C | D | E |
| Composition No. | 1 | 2 | 3 | 4 | 5 |
| Burning Time (sec.) | 91 | 73 | 91 | 91 | 10 |
| Burned Length (in.) | 5.5* | 5.5* | 5.5* | 5.5* | 0.75 |

*Coating completely consumed.

B. Composites were prepared as described in A except that after the composites were heated in a hot air oven at 320° F. for 30 minutes, the composites were further heated in a hot air oven at 350° F. for 3 hours. Test strips were cut and combustion tested as described above. Results of this testing are shown in Table 2.

TABLE 2

| | Composite | | | | |
|---|---|---|---|---|---|
| | A' | B' | C' | D' | E' |
| Composition No. | 1 | 2 | 3 | 4 | 5 |
| Burning Time (sec.) | 94 | 97 | 94 | 83 | 14 |
| Burned Length (in.) | 5.5* | 5.5* | 5.5* | 5.5* | 0.75 |

*Coating completely consumed.

This example illustrates that, although platinum or cerium alone did not retard the combustion of the composite test strips (Composites B, C, and D), the combination of platinum and cerium (Composite E) significantly retarded the combustion of the composite test strip.

EXAMPLE 3

Preparation and Combustion Testing of Aminoorganosiloxane Compositions Containing Varying Amounts of Cerium A. 100 parts by weight of the coating base of Example 1-B were added to a solvent mixture of 400 parts by weight of toluene and 71 parts by weight of n-butanol and stirred for 16 hours at room temperature to form a solution free of visible particles. To 100 parts by weight of the solution so formed were added 0.175 parts by weight of Demodur KL-5-2371; 0.01207 parts by weight of chloroplatinic acid/divinyltetramethyldisiloxane complex (commercially available as Petrarch Systems PC-075) to provide 30 parts platinum per million parts aminoorganopolysiloxane polymer; and varying amounts cerium octoate (see Table 3 below) to produce the following compositions:

TABLE 3

| Ingredients | Composition No. | | | | | | | | |
|---|---|---|---|---|---|---|---|---|---|
| | 6 | 7 | 8 | 9 | 10 | 11 | 12 | 13 | 14 |
| Coating Base (from Ex. 1-B) (parts by weight) | 100 | 100 | 100 | 100 | 100 | 100 | 100 | 100 | 100 |
| Desmodur KL-5-2371 (parts by weight) | 0.175 | 0.175 | 0.175 | 0.175 | 0.175 | 0.175 | 0.175 | 0.175 | 0.175 |
| Platinum[1] (ppm*) | 30 | 30 | 30 | 30 | 30 | 30 | 0 | 30 | 0 |
| Cerium[2] (ppm*) | 6959 | 4971 | 2983 | 994 | 497 | 99 | 0 | 0 | 6959 |

*Parts per million parts aminoorganopolysiloxane polymer.
[1]Added as chloroplatinic acid/divinyltetramethyldisiloxane. (Petrarch Systems PC-075)
[2]Added as cerium octoate.

B. Composites were prepared and combustion tests run as described in Example 2-A using the Compositions No. 6–14. Results of this combustion testing are shown in Table 4.

TABLE 4

| | Composite (Cloth & Composition) | | | | | | | | |
|---|---|---|---|---|---|---|---|---|---|
| | F | G | H | I | J | K | L | M | N |
| Composition No. | 6 | 7 | 8 | 9 | 10 | 11 | 12 | 13 | 14 |
| Burning Time (sec.) | 8 | 11 | 53 | 44 | 34 | 50 | 97 | 92 | 101 |
| Burned Length (in.) | 0.5 | 0.75 | 2.0 | 1.5 | 1.5 | 1.0 | 6.0* | 6.0* | 6.0* |

*Coating completely consumed.

This example illustrates that even with as little as 99 ppm of cerium, the combination of platinum and cerium (Composites F to K) provided significantly improved combustion resistance when added to the aminoorganopolysiloxane compositions. Platinum and cerium alone were ineffective (Composites M and N).

EXAMPLE 4

Preparation and Combustion Testing of Aminoorganosiloxane Compositions Containing Various Rare Earth Metals A. 100 parts by weight of the coating base of Example 1-B were added to a solvent mixture of 400 parts by weight of toluene and 71 parts by weight of n-butanol and stirred for 16 hours at room temperature to form a solution free of visible particles.

B. The following compositions were prepared:

| | Composition No. | | | | | | | | | |
|---|---|---|---|---|---|---|---|---|---|---|
| Ingredients | 15 | 16 | 17 | 18 | 19 | 20 | 21 | 22 | 23 | 24 |
| Solution from A (parts by weight) | 100 | 100 | 100 | 100 | 100 | 100 | 100 | 100 | 100 | 100 |
| Desmodur KL-5-2371 (parts by weight) | 0.175 | 0.175 | 0.175 | 0.175 | 0.175 | 0.175 | 0.175 | 0.175 | 0.175 | 0.175 |
| Platinum[1] (ppm*) | 0 | 30 | 0 | 30 | 0 | 30 | 0 | 30 | 0 | 30 |
| Cerium[2] (ppm*) | 1000 | 1000 | — | — | — | — | — | — | — | — |
| Dysprosium[3] (ppm*) | — | — | 1000 | 1000 | — | — | — | — | — | — |
| Europium[4] (ppm*) | — | — | — | — | 1000 | 1000 | — | — | — | — |
| Samarium[5] (ppm*) | — | — | — | — | — | — | 1000 | 1000 | — | — |
| Thulium[6] (ppm*) | — | — | — | — | — | — | — | — | 1000 | 1000 |

*Parts per million parts of aminoorganopolysiloxane polymer.
[1]Added as chloroplatinic acid/divinyltetramethyldisiloxane complex (Petrarch Systems PC-075).
[2]Added as cerium octoate.
[3]Added as dysprosium naphthenate.
[4]Added as europium 2-ethylhexanoate.
[5]Added as samarium naphthenate.
[6]Added as thulium chloride heptahydrate.

C. Composites were prepared and combustion tests performed as described in Example 2-A using Compositions No. 15-24. Results of the combustion testing are shown in Table 5.

| | Composite (Cloth & Composition) | | | | | | | | | |
|---|---|---|---|---|---|---|---|---|---|---|
| | O | P | Q | R | S | T | U | V | W | X |
| Composition No. | 15 | 16 | 17 | 18 | 19 | 20 | 21 | 22 | 23 | 24 |
| Burning Time (sec.) | 164 | 25 | 296 | 30 | 202 | 35 | 93 | 28 | 133 | 27 |
| Burning Length (in.) | 6.0* | 0.75 | 6.0* | 0.75 | 6.0* | 0.75 | 6.0* | 1.0 | 6.0* | 0.88 |

*Compostion completely consumed.

This example illustrates that although the addition of the rare earth metal compounds alone (Composites O, Q, S, U and W) did not provide a high level of combustion resistance to the composite test strips, the same rare earth metal compounds in combination with platinum (Composites P, R, T, V and X) significantly retarded the combustion of the test strips.

EXAMPLE 5

Preparation and Combustion Testing of Aminoorganopolysiloxane Compositions Containing Different Platinium Compounds A. 100 parts by weight of the coating base of Example 1-B were added to a solvent mixture of 400 parts by weight of toluene and 71 parts by weight of n-butanol and stirred for 16 hours at room temperature to form a solution.

B. The following compositions were prepared:

| | Composition No. | | | | | | | |
|---|---|---|---|---|---|---|---|---|
| Ingredient | 25 | 26 | 27 | 28 | 29 | 30 | 31 | 32 |
| Solution from C (parts by weight) | 100 | 100 | 100 | 100 | 100 | 100 | 100 | 100 |
| Desmodur KL-5-2371 (parts by weight) | 0.175 | 0.175 | 0.175 | 0.175 | 0.175 | 0.175 | 0.175 | 0.175 |
| Cerium[1] (ppm*) | 0 | 6959 | 0 | 6959 | 0 | 6959 | 0 | 6959 |
| Platinum (ppm*) | 0 | 0 | 30[2] | 30[2] | 30[3] | 30[3] | 30[4] | 30[4] |

*Parts per million parts aminoorganopolysiloxane polymer.
[1]Added as cerium octoate.
[2]Added as chloroplatinic acid/divinyltetramethyldisiloxane complex (Petrarch Systems PC-075).
[3]Added as chloroplatinic acid/methylvinylcyclosiloxane complex.
[4]Added as chloroplatinic acid.

C. Composites were prepared and combustion tests performed as described in Example 2-A using Compositions 25-32. Results of this combustion testing are shown in Table 6.

TABLE 6

| | Composite (Cloth & Composition) | | | | | | | |
|---|---|---|---|---|---|---|---|---|
| | AA | BB | CC | DD | EE | FF | GG | HH |
| Composition No. | 25 | 26 | 27 | 28 | 29 | 30 | 31 | 32 |
| Burning | 101 | 118 | 79 | 16 | 49 | 14 | 114 | 27 |

TABLE 6-continued

| | Composite (Cloth & Composition) | | | | | | | |
|---|---|---|---|---|---|---|---|---|
| | AA | BB | CC | DD | EE | FF | GG | HH |
| Time (sec.) Burned Length (in.) | 6.0* | 6.0* | 4.0 | 0.5 | 1.5 | 0.75 | 6.0* | 1.25 |

*Coating completely consumed.

Composites containing the platinum compounds chloroplatinic acid/divinyltetramethyldisiloxane complex (Composite CC) and chloroplatinic acid/methylvinylcyclosiloxane complex (Composite EE) alone had improved combustion resistance compared to composites not containing platinum. However, the combination of cerium and platinum-siloxane-complex provided the largest increase in combustion resistance in the test strips regardless of the platinum complex used.

EXAMPLE 6

Preparation and Combustion Testing of Aminoorganopolysiloxane Compositions Containing Various Metals A. 210 parts by weight of the coating base of Example 1-B were added to a solvent mixture of 841 parts by weight of toluene and 149 parts by weight of n-butanol and stirred for 16 hours at room temperature to form a solution.

B. The following two series of compositions were prepared:

| Ingredient | Composition I | Composition II |
|---|---|---|
| Solution from A (parts by weight) | 100 | 100 |
| Desmodur KL-5-2371 (parts by weight) | 0.175 | 0.175 |
| Platinum[1] (ppm*) | — | 30 |
| Other metal (ppm*) (see Tables 7A and 7B below) | 1000 | 1000 |

*Parts of metal per million parts aminoorganopolysiloxane polymer.
[1]Added as chloroplatinic acid/divinyltetramethyldisiloxane complex (PC-075, Petrarch Systems).

Composites were prepared from the compositions and combustion testing performed as described in Example 2-A. Results of the combustion testing are shown in Tables 7A and 7B. Table 7A is a tabulation of the results obtained with the tested metal compounds that were effective as combustion inhibitors. Table 7B is a tabulation of the results obtained with the tested metal compounds that were not effective as combustion inhibitors.

TABLE 7A

| | Composites (Cloth & Composition) | | | |
|---|---|---|---|---|
| | Composition I | | Composition II | |
| Metal Compound | Burning Time (Seconds) | Burned Length (Inches) | Burning Time (Seconds) | Burned Length (Inches) |
| Barium 2-Ethylhexanoate | 170 | 6[1] | 65 | 1.5 |
| Bismuth Octoate | 147 | 6 | 62 | 2.0 |
| Boron, Trimethoxy | 101 | 6 | 67 | 2.0 |
| Calcium Octoate | 167 | 6 | 24 | 0.5 |
| Cobalt Octoate | 75 | 6 | 13 | 1.0 |
| Gallium Acetylacetonate | 173 | 6 | 34 | 0.75 |
| Magnesium Naphthenate | 121 | 6 | 10 | 1.0 |
| Manganese Octoate | 126 | 6 | 17 | 1.0 |
| Nickel Octoate | 135 | 6 | 43 | 2.0 |
| Palladium Acetylacetonate | 56 | 4 | 0 | 0.5 |
| Thorium Acetylacetonate | 126 | 6 | 17 | 0.75 |
| Uranyl Diacetate | 115 | 6 | 47 | 2.0 |
| Yttrium Naphthenate | 84 | 6 | 47 | 0.5 |
| Zinc Octoate | 130 | 6 | 36 | 1.25 |
| Zirconium Octoate | 121 | 6 | 28 | 1.0 |
| Chromium Oleate | 36 | 0.5 | 14 | 0.5 |
| Iridium Trichloride | 24 | 0.5 | 14 | 0.5 |
| Molybdenum Octoate | 24 | 2.0 | 3 | 0.75 |
| Rhodium Octanoate Dimer | 0 | 0.5 | 0 | 0.5 |

[1]A burned length of 6 inches indicates that the aminoorganopolysiloxane composition of the composite was completely consumed.

TABLE 7B

| | Composites (Cloth & Composition) | | | |
|---|---|---|---|---|
| | Composition I | | Composition II | |
| Metal Compound | Burning Time (Seconds) | Burned Length (Inches) | Burning Time (Seconds) | Burned Length (Inches) |
| Antimony n-butoxide | 102 | 6[1] | 164 | 6 |
| Cadmium 2-Ethylhexanoate | 172 | 6 | 136 | 6 |
| Cesium 2-Ethylhexanoate | 102 | 6 | 91 | 6 |
| Copper 2-Ethylhexanoate | 213 | 6 | 259 | 6 |
| Iron Octoate | 120 | 6 | 96 | 6 |
| Lead Octoate | 120 | 6 | 213 | 6 |
| Ruthenium Acetylacetonate | 116 | 6 | 102 | 6 |
| Silver 2-Ethylhexanoate | 98 | 6 | 150 | 6 |
| Tin (II) Octoate | 95 | 6 | 88 | 6 |
| Titanium 2-Ethylhexoxide | 121 | 6 | 101 | 6 |
| Aluminum 2-Ethylhexanoate | 47 | 6 | 38 | 6 |
| Indium Acetylacetonate | 66 | 6 | 111 | 6 |
| Lithium 2-Ethylhexanoate | 36 | 6 | 34 | 6 |
| Sodium 2-Ethylhexanoate | 55 | 6 | 57 | 6 |
| Vanadium Acetylacetonate | 62 | 6 | 72 | 6 |

[1]A burned length of 6 inches indicates that the aminoorganopolysiloxane composition of the composite was completely consumed.

This example illustrates the effectiveness of combinations of platinum and various other metals in improving the combustion resistance of cured aminoorganopolysiloxane compositions. This example further illustrates the effectiveness of chromium, iridium, molybdenum, and rhodium alone (i.e., without platinum) in improving the combustion resistance of cured aminoorganopolysiloxane compositions.

This example also illustrates that certain metals, alone and in combination with platinum, are ineffective in improving the combustion resistance of cured aminoorganopolysiloxane compositions. Certain metals, namely aluminum, indium, lithium, sodium and vanadium, appear to accelerate the combustion of the cured aminoorganopolysiloxane compositions with or without the presence of platinum.

EXAMPLE 7

Preparation and Combustion Testing of Aminoorganopolysiloxane Compositions Containing Platinum and Diphenylsilanediol A. 100 parts by weight of the coating base of Example 1-B were added to 595 parts by weight of toluene and 105 parts by weight of n-butanol and stirred at room temperature to form a solution.

B. The following solutions were prepared:

| Ingredient | Composition No. | | | | | | |
|---|---|---|---|---|---|---|---|
| | 33 | 34 | 35 | 36 | 37 | 38 | 39 |
| Solution of A (parts by weight) | 100 | 100 | 100 | 100 | 100 | 100 | 100 |
| Desmodur KL-5-2371 (parts by weight) | 0.175 | 0.175 | 0.175 | 0.175 | 0.175 | 0.175 | 0.175 |
| Diphenylsilanediol (pph*) | — | 10 | — | — | 10 | 10 | — |
| Platinum[1] (pph*) | — | — | 0.003 | — | 0.003 | — | 0.003 |
| Cerium[2] (pph*) | — | — | — | 0.696 | — | 0.696 | 0.696 |

*Parts per hundred parts aminoorganopolysiloxane polymer.
[1] Added as chloroplatinic acid/1,3-divinyltetramethyldisiloxane complex.
[2] Added as cerium octoate.

C. Composites were prepared and combustion testing was performed as described in Example 2-A. Results of the combustion testing are shown in Table 8.

TABLE 8

| | Composites (Cloth & Composition) | | | | | | |
|---|---|---|---|---|---|---|---|
| | II | JJ* | KK | LL | MM* | NN* | OO |
| Composition No. | 33 | 34 | 35 | 36 | 37 | 38 | 39 |
| Burning Time (sec.) | 91 | 84 | 73 | 91 | 46 | 102 | 10 |
| Burned Length (in.) | 5.5** | 5.5** | 5.5** | 5.5** | 2.5 | 5.5** | 0.75 |

*The hot air cured coating of this test strip formed from the composition was milky and semi-opaque, not transparent.
**Composition completely consumed.

This example illustrates that the addition of a combination of platinum and diphenylsilanediol or platinum and cerium compounds to the aminoorganopolysiloxane composition improves the combustion resistance of the cured composition.

What is claimed is:

1. A combustion-resistant heat-curable aminoorganopolysiloxane composition comprising:
   (a) an aminoorganopolysiloxane polymer containing an average of at least one hydrogen atom bonded to nitrogen in at least two of the silicon-bonded primary or secondary aminoorgano groups;
   (b) the reaction product of an organic polyisocyanate and a compound containing an alcoholic, phenolic, silanic or oximyl hydroxyl group or thiol group as a curing agent; and
   (c) a combustion inhibiting amount of an additive selected from the group consisting of:
   (i) a chromium compound;
   (ii) an iridium compound;
   (iii) a molybdenum compound;
   (iv) a rhodium compound;
   (v) a mixture of (I) platinum or a platinum compound and (II) a compound selected from the group consisting of a barium compound, a bismuth compound, a boron compound, a calcium compound, a chromium compound, a cobalt compound, a gallium compound, an iridium compound, a magnesium compound, a manganese compound, a molybdenum compound, a nickel compound, a palladium compound, a rhodium compound, a thorium compound, an uranyl compound, an yttrium compound, a zinc compound, a zirconium compound and a rare earth metal compound; and
   (vi) a mixture of platinum or a platinum compound and a dihydrocarbylsilanediol.

2. A composition as recited in claim 1 wherein the additive is a chromium compound, an iridium compound, a molybdenum compound or a rhodium compound.

3. A composition as recited in claim 2 wherein the additive is present in an amount to provide about 100 to about 3000 parts of chromium, iridium, molybdenum or rhodium per million parts of aminoorganopolysiloxane polymer.

4. A composition as recited in claim 3 wherein the additive is present in an amount to provide about 300 to about 2000 parts of chromium, iridium, molybdenum, or rhodium per million parts of aminoorganosiloxane polymer.

5. A composition as recited in claim 1 wherein the additive is a mixture of (I) platinum or a platinum compound and (II) a compound selected from the group consisting of a barium compound, a bismuth compound, a boron compound, a calcium compound, a chromium compound, a cobalt compound, a gallium compound, an iridium compound, a magnesium compound, a manganese compound, a molybdenum compound, a nickel compound, a palladium compound, a rhodium compound, a thorium compound, an uranyl compound, an yttrium compound, a zinc compound, a zirconium compound and a rare earth metal compound.

6. A composition as recited in claim 5 wherein the platinum or the platinum compound is present in an amount to provide about 1 to about 100 parts of platinum per million parts of aminoorganopolysiloxane polymer; the rare earth metal compound is present in an amount to provide about 100 to about 7000 parts of rare earth metal per million parts of aminoorganopolysiloxane polymer; and the barium compound, the bismuth compound, the boron compound, the calcium compound, the chromium compound, the cobalt compound, the gallium compound, the iridium compound, the magnesium compound, the magnanese compound, the molybdenum compound, the nickel compound, the palladium compound, the rhodium compound, the thorium compound, the uranyl compound, the yttrium compound, the zinc compound or the zirconium compound is present in an amount to provide about 100 to 3000 parts of barium, bismuth, boron, calcium, chromium, cobalt, gallium, iridium, magnesium, manganese, molybdenum, nickel, palladium, rhodium, thorium, uranyl, yttrium, zinc or zirconium per million parts of aminoorganopolysiloxane polymer.

7. A composition as recited in claim 6 wherein the platinum or the platinum compound is present in an amount to provide about 5 to about 60 parts of platinum per million parts of aminoorganopolysiloxane polymer; the rare earth metal compound is present in an amount to provide about 300 to about 500 parts of rare earth metal per million parts of aminoorganopolysiloxane polymer; and the barium compound, the bismuth compound, the boron compound, the calcium compound, the chromium compound, the cobalt compound, the gallium compound, the iridium compound, the magnesium compound, the manganese compound, the molybdenum compound, the nickel compound, the palladium compound, the rhodium compound, the thorium compound, the uranyl compound, the yttrium compound, the zinc compound or the zirconium compound is present in an amount to provide about 100 to 3000 parts of barium, bismuth, boron, calcium, chromium, cobalt, gallium, iridium, magnesium, manganese, molybdenum, nickel, palladium, rhodium, thorium, uranyl, yttrium, zinc or zirconium per million parts of aminoorganopolysiloxane polymer.

8. A composition as recited in claim 7 wherein the additive is a mixture of a platinum compound and a rare earth metal compound.

9. A composition as recited in claim 8 wherein the rare earth metal is cerium.

10. A composition as recited in claim 9 wherein the cerium compound is a compound formed from cerium and an aliphatic carboxylic acid having 6 to 18 carbon atoms or a complex of cerium and a beta-diketone.

11. A composition as recited in claim 1 wherein the additive is a mixture of a platinum compound and diphenylsilanediol.

12. A composition as recited in claim 11 wherein the platinum compound is present in an amount to provide about 1 to about 100 parts of platinum per million parts of aminoorganopolysiloxane polymer and the diphenylsilanediol is present in an amount of about 1 to about 15 parts per hundred parts of aminoorganopolysiloxane polymer.

13. A combustion-resistant heat-curable aminoorganopolysiloxane composition comprising:
 (a) an aminoorganopolysiloxane polymer containing an average of at least one hydrogen atom bonded to nitrogen in at least two of the silicon-bonded primary or secondary aminoorgano groups;
 (b) the reaction product of an organic polyisocyanate and a compound containing an alcoholic, phenolic, silanic or oximyl hydroxyl group or thiol group;
 (c) a filler;
 (d) a hydroxyl end-blocked organopolysiloxane fluid having an average molecular weight of from about 200 to about 2,000; and
 (e) a combustion inhibiting amount of an additive selected from the group consisting of:
  (i) a chromium compound;
  (ii) an iridium compound;
  (iii) a molybdenum compound;
  (iv) a rhodium compound;
  (v) a mixture of (I) a platinum compound and (II) a compound selected from the group consisting of a barium compound, a bismuth compound, a boron compound, a calcium compound, a chromium compound, a cobalt compound, a gallium compound, an iridium compound, a magnesium compound, a manganese compound, a molybdenum compound, a nickel compound, a palladium compound, a rhodium compound, a thorium compound, a uranyl compound, an yttrium compound, a zinc compound, a zirconium compound and a rare earth metal compound; and
  (vi) a mixture of a platinum compound and a dihydrocarbylsilanediol.

14. A composition as recited in claim 13 wherein the additive is a chromium compound, an iridium compound, a molybdenum compound or a rhodium compound.

15. A composition as recited in claim 14 wherein the additive is present in an amount to provide about 100 to about 3000 parts of chromium, iridium, molybdenum or rhodium per million parts of aminoorganopolysiloxane polymer.

16. A composition as recited in claim 15 wherein the additive is present in an amount to provide about 300 to about 2000 parts of chromium, iridium, molybdenum, or rhodium per million parts of aminoorganosiloxane polymer.

17. A composition as recited in claim 14 wherein the additive is chromium oleate.

18. A composition as recited in claim 14 wherein the additive is iridium trichloride.

19. A composition as recited in claim 14 wherein the additive is molybdenum octoate.

20. A composition as recited in claim 14 wherein the additive is rhodium octanoate dimer.

21. A composition as recited in claim 13 wherein the additive is a mixture of (I) a platinum compound and (II) a compound selected from the group consisting of a barium compound, a bismuth compound, a boron compound, a calcium compound, a chromium compound, a cobalt compound, a gallium compound, an iridium compound, a magnesium compound, a manganese compound, a molybdenum compound, a nickel compound, a palladium compound, a rhodium compound, a thorium compound, an uranyl compound, an yttrium compound, a zinc compound, a zirconium compound and a rare earth metal compound.

22. A composition as recited in claim 21 wherein the platinum compound is present in an amount to provide about 1 to about 100 parts of platinum per million parts of aminoorganopolysiloxane polymer; the rare earth metal compound is present in an amount to provide about 100 to about 7000 parts of rare earth metal per million parts of aminoorganopolysiloxane polymer; and the barium compound, the bismuth compound, the boron compound, the calcium compound, the chromium compound, the cobalt compound, the gallium compound, the iridium compound, the magnesium compound, the manganese compound, the molybdenum compound, the nickel compound, the palladium compound, the rhodium compound, the thorium compound, the uranyl compound, the yttrium compound, the zinc compound or the zirconium compound is present in an amount to provide about 100 to 3000 parts of barium, bismuth, boron, calcium, chromium, cobalt, gallium, iridium, magnesium, manganese, molybdenum, nickel, palladium, rhodium, thorium, uranyl, yttrium, zinc or zirconium per million parts of aminoorganopolysiloxane polymer.

23. A composition as recited in claim 22 wherein the platinum compound is present in an amount to provide about 5 to about 60 parts of platinum per million parts of aminoorganopolysiloxane polymer; the rare earth metal compound is present in an amount to provide about 300 to about 5000 parts of rare earth metal per million parts of aminoorganopolysiloxane polymer; and the barium compound, the bismuth compound, the boron compound, the calcium compound, the chromium compound, the cobalt compound, the gallium compound, the iridium compound, the magnesium compound, the manganese compound, the molybdenum compound, the nickel compound, the palladium compound, the rhodium compound, the thorium compound, the uranyl compound, the yttrium compound, the zinc compound or the zirconium compound is present in an amount to provide about 100 to 3000 parts of barium, bismuth, boron, calcium, chromium, cobalt, gallium, iridium, magnesium, manganese, molybdenum, nickel, palladium, rhodium, thorium, uranyl, yttrium, zinc or zirconium per million parts of aminoorganopolysiloxane polymer.

24. A composition as recited in claim 23 wherein the additive is a mixture of a platinum compound and a rare earth metal compound.

25. A composition as recited in claim 24 wherein the rare earth metal is cerium.

26. A composition as recited in claim 25 wherein the cerium compound is a compound formed from cerium and an aliphatic carboxylic acid having 6 to 18 carbon atoms or a complex of cerium and a beta-diketone.

27. A composition as recited in claim 21 wherein the platinum compound is chloroplatinic acid.

28. A composition as recited in claim 21 wherein the platinum compound is chloroplatinic acid/divinyltetramethyldisiloxane complex.

29. A composition as recited in claim 21 wherein the platinum compound is chloroplatinic acid/methylvinylcyclosiloxane complex.

30. A composition as recited in claim 21 wherein the compound (II) is cerium octoate.

31. A composition as recited in claim 21 wherein the compound (II) is dysprosium naphthenate.

32. A composition as recited in claim 21 wherein the compound (II) is europium 2-ethylhexanoate.

33. A composition as recited in claim 21 wherein the compound (II) is samarium naphthenate.

34. A composition as recited in claim 21 wherein the compound (II) is thulium chloride heptahydrate.

35. A composition as recited in claim 21 wherein the compound (II) is barium 2-ethylhexanoate.

36. A composition as recited in claim 21 wherein the compound (II) is bismuth octoate.

37. A composition as recited in claim 21 wherein the compound (II) is trimethoxy boron.

38. A composition as recited in claim 21 wherein the compound (II) is calcium octoate.

39. A composition as recited in claim 21 wherein the compound (II) is cobalt octoate.

40. A composition as recited in claim 21 wherein the compound (II) is gallium acetylacetonate.

41. A composition as recited in claim 21 wherein the compound (II) is magnesium naphthenate.

42. A composition as recited in claim 21 wherein the compound (II) is magnesium octoate.

43. A composition as recited in claim 21 wherein the compound (II) is nickel octoate.

44. A composition as recited in claim 21 wherein the compound (II) is palladium acetylacetonate.

45. A composition as recited in claim 21 wherein the compound (II) is thorium acetylacetonate.

46. A composition as recited in claim 21 wherein the compound (II) is uranyl diacetate.

47. A composition as recited in claim 21 wherein the compound (II) is yttrium naphthenate.

48. A composition as recited in claim 21 wherein the compound (II) is zinc octoate.

49. A composition as recited in claim 21 wherein the compound (II) is zirconium octoate.

50. A composition as recited in claim 21 wherein the compound (II) is chromium oleate.

51. A composition as recited in claim 21 wherein the compound (II) is iridium trichloride.

52. A composition as recited in claim 21 wherein the metal compound (II) is molybdenum octoate.

53. A composition as recited in claim 21 wherein the compound (II) is rhodium octanoate dimer.

54. A composition as recited in claim 21 wherein the additive is a mixture of a platinum compound and diphenylsilanediol.

55. A composition as recited in claim 54 wherein the platinum compound is present in an amount to provide about 1 to about 100 parts of platinum per million parts of aminoorganopolysiloxane polymer and the diphenylsilanediol is present in an amount of about 1 to about 15 parts per hundred parts of aminoorganopolysiloxane polymer.

* * * * *